United States Patent Office 3,446,132
Patented May 27, 1969

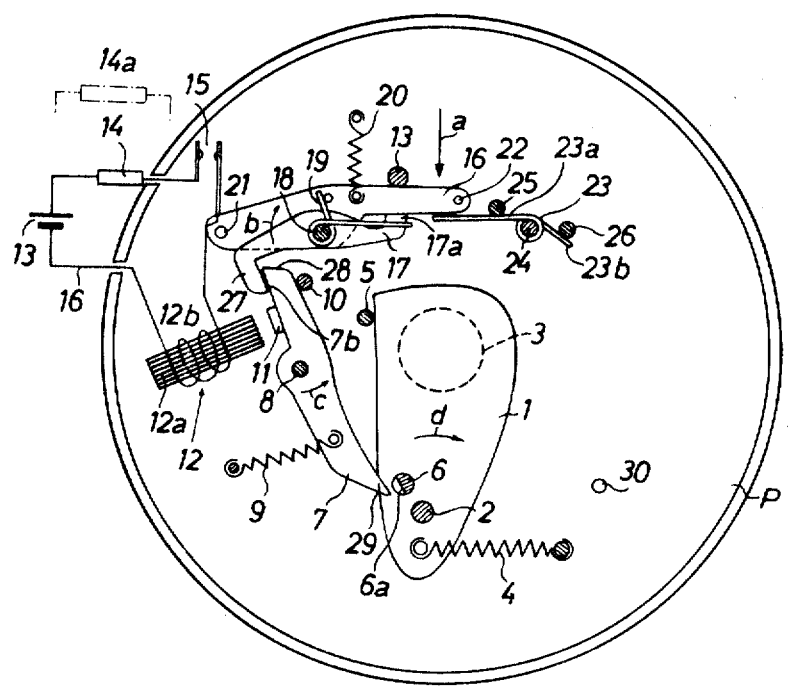

3,446,132
PHOTOGRAPHIC IMPACT SHUTTER
Günter Fauth, Unterhaching, near Munich, Germany, assignor to Agfa-Gevaert Aktiengesellschaft, Leverkusen, Germany
Filed Mar. 3, 1966, Ser. No. 531,430
Claims priority, application Germany, Mar. 13, 1965, A 48,626
Int. Cl. G03b 9/10, 9/60
U.S. Cl. 95—53   19 Claims

ABSTRACT OF THE DISCLOSURE

A camera wherein an impeller can be propelled from a position of rest at several speeds to move a shutter blade from closed position for different periods of time. The impeller is propelled from the position of rest by an electromagnet which is in circuit with a resistor whereby the resistance of the resistor determines the speed of the impeller and hence the exposure time.

---

The present invention relates to photographic cameras in general, and more particularly to improvements in a structure which can control the shutter to provide different exposure times.

It is an important object of the invention to provide a very simple, rugged and compact shutter controlling structure for photographic cameras.

Another object of the invention is to provide a structure which comprises a small number of component parts, which can be used in connection with single-blade or multi-blade shutters, and which can select the exposure time as a function of the intensity of light coming from a viewed scene or subject.

A further object of the invention is to provide a novel motion transmitting arrangement which can directly displace the shutter from its normal closed position.

An additional object of the invention is to provide a structure which can determine the exposure time for exposures in daylight or artificial light.

A concomitant object of the invention is to provide an improved trigger unit which may be used in a structure of the above outlined characteristics.

Still another object of the invention is to provide a novel impeller-operated shutter.

A further object of my invention is to provide a very simple, reliable and long-lasting electric circuit which can be incorporated in a structure of the above outlined characteristics.

An additional object of the invention is to provide a structure wherein the displacement of one or more shutter blades from closed position requires the exertion of a relatively weak force.

Briefly stated, one feature of my invention resides in the provision of a photographic camera which comprises an impeller movable from a position of rest at a plurality of speeds each of which corresponds to a different exposure time, and actuating means for moving the impeller from such position of rest. The actuating means comprises an electromagnet which is arranged to displace the impeller, a resistor (preferably a light-sensitive resistor) in circuit with the electromagnet, and operating means for selectively closing the circuit. Such operating means preferably includes a hand-operated trigger unit which can close a normally open control switch in the circuit of the resistor.

The impeller can transmit impacts to a normally closed shutter whereby the magnitude of such impacts determines the length of exposure time. This can be achieved by causing the blade or blades of the shutter to rebound, in fully open position, from one or more abutments so that they return more rapidly to their closed positions if the impact transmitted thereto causes them to travel more rapidly and to rebound more strongly from such abutment or abutments.

The construction and mounting of the operating means are preferably such that the operator can feel when the circuit of the electromagnet is completed and that the impeller is blocked in the position of rest until after the electromagnet is actually energized, i.e., until after the magnetic field has been permitted to build up and to exert against the impeller an attracting force which is a true function of the intensity of light impinging against a light-sensitive resistor or of the resistance offered by another suitable resistor which may replace a light-sensitive resistor.

The novel features which are considered as characteristic of the invention are set forth in particular in the appended claims. The improved camera itself, however, both as to its construction and its mode of operation, together with additional features and advantages thereof, will be best understood upon perusal of the following detailed description with reference to the accompanying drawing the single illustration of which is a diagrammatic front elevational view of a structure which can select the exposure time as a function of light intensity, certain component parts of the structure being shown in section.

Referring to the drawing in detail, there is shown a portion of a still camera including a supporting plate P provided with a diaphragm opening 3 which is normally concealed by the single blade 1 of a shutter rockable about a pivot pin 2 carried by the plate P. A resilient element in the form of a helical spring 4 is connected with the blade 1 and tends to maintain it in the illustrated closed position whereby the blade bears against a fixed stop 5 on the plate P. In order to expose the opening 3, the blade 1 must be rocked in a clockwise direction (see the arrow d) and can rebound by impinging against a fixed abutment member 30.

The blade 1 is further provided with a motion receiving pin 6 having a facet 6a which may be struck by the lower arm 29 of a rockable impeller 7. This impeller resembles a two-armed lever and is mounted on a pivot pin 8 carried by the plate P. A resilient element in the form of a helical spring 9 biases the impeller 7 to a position of rest in which the upper arm 28 of the impeller abuts against a stop pin 10.

The actuating means which can propel the impeller 7 against the motion receiving pin 6 of the blade 1 comprises an electromagnet 12 whose core 12a is mounted on the plate P and whose armature 11 is secured to the arm 28. When the electromagnet 12 is energized, the core 12a attracts the armature 11 and, if the impeller 7 is free to follow the attracting force, its arm 29 strikes against the pin 6 with a force which depends on the strength of the magnetic field and on the speed of the impeller 7 whereby the blade 1 is swung from its closed position and may expose the opening 3 for a predetermined interval of time. The aforementioned actuating means further comprises a battery or another suitable source 13 of electrical energy which is connected in series with the coil 12b of the electromagnet, a light-sensitive resistor 14 which is connected in series with the source 13, and a normally open control switch 15 which is connected between the resistor 14 and the coil 12b of the electromagnet 12. The actuating means also comprises operating means including a trigger unit which is operable by hand and may close the control switch 15 in order to complete the circuit and to effect energization of the electromagnet 12. The trigger unit comprises two levers 16, 17 which are rockable about a common pivot pin 18 and are biased by a torsion spring 19 in such a way that the lever 17 normally shares movements of the lever 16, the latter being rockable by hand in a direction as indicated by an arrow a. A relatively weak return spring 20 tends to maintain the levers 16, 17 in an idle position in which the lever 16 abuts against a stop pin 13.

An indicator, which enables the operator to sense when a projection or trip 21 at the forward end of the lever 16 has closed the control switch 15, comprises a torsion spring 23 which is coiled around a fixed shaft 24 and comprises two terminals 23a, 23b. When the trigger unit 16, 17 is in the idle position shown in the drawing, the terminal 23a bears against a stop pin 25. The other terminal 23b bears continuously against a stop pin 26. The lever 17 comprises an anvil 17a which is engaged by one terminal of the torsion spring 19 and bears against the adjoining portion of the lever 16. The lever 17 further comprises a blocking portion or pawl 27 which normally engages a face 7b on the arm 28 of the impeller 7 and holds the latter in the illustrated position of rest, i.e., in a position in which the arm 28 abuts against the stop pin 10.

The terminal 23a of the indicator spring 23 may be engaged by a projection 22 on the rear arm of the lever 16, not earlier than at a time when the trip 21 has closed the control switch 15. The direction of such movement of the trip 21 is indicated by an arrow b. The arrow c indicates the direction in which the impeller 7 travels when it is propelled against the pin 6 of the blade 1.

If the operator wishes to make an exposure, he applies finger pressure against the rear arm of the lever 16 as indicated by the arrow a whereby the levers 16, 17 turn in a clockwise direction (arrow b) and the trip 21 of the lever 16 closes the control switch 15. This completes the circuit and the electromagnet 12 is energized so that the core 12a attracts the armature 11 with a force which is determined by the momentary resistance of the resistor 14, i.e., by the intensity of light which impinges against the resistor. If the intensity of incoming light is higher, the element 14 offers a lesser resistance to the flow of electric current and the force with which the core 12a of the electromagnet 12 attracts the impeller 7 (through the intermediary of the armature 11) is weaker. The resistance of the element 14 is higher if the intensity of incoming light is weaker.

The operator continues to apply finger pressure against the lever 16 whereby this lever moves beyond that (operative) position in which the trip 21 has closed the switch 15. This causes the rear arm of the lever 16 to bear against the terminal 23a of the spring 23 which offers a certain resistance and such resistance is felt by the operator who is then aware of the fact that the switch 15 is closed, i.e., that the electromagnet 12 is energized.

As the levers 16, 17 continue to turn in the direction of the arrow b, the blocking pawl 27 moves away from the face 7b on the arm 28 of the impeller 7 and the latter can follow the attracting force of the electromagnet 12 (arrow c) so that its lower arm 29 "kicks" against the motion receiving pin 6 and propels the blade 1 from the closed position. The impeller 7 is displaced against the bias of the spring 4, see the arrow d. Depending on the strength of the magnetic field of the electromagnet 12, the impact transmitted by the impeller 7 to the blade 1 is greater or weaker, such impact being a function of the intensity of light which impinges against the light sensitive resistor 14.

The impeller 7 can propel the arm 1 all the way into abutment with the member 30 and, if the impact transmitted by the impeller 7 is strong enough, the blade 1 can actually rebound on the member 30 to rapidly return to the closed position. In other words, such rebounding of the blade 1 assists the bias of the spring 4 which invariably tends to hold the blade in the closed position and against the stop pin 5. Also, the magnitude of the impact transmitted by the impeller 7 will determine the speed at which the opening 3 is exposed because the blade 1 is accelerated more rapidly if its pin 6 receives a strong kick.

When the intensity of incoming light is low, the magnetic field of the electromagnet 12 is weak and the impeller 7 is attracted by a weaker force so that its impetus is smaller and the length of the interval during which the opening 3 remains exposed is longer.

When the blade 1 moves back to its closed position, the armature 11 is still attracted by the core 12a of the electromagnet 12 so that the lower arm 29 of the impeller 7 is not in the path of the returning pin 6, i.e., the impeller cannot prevent return movement of the blade to its closed position. The operator then releases the lever 16 so that it can follow the bias of the springs 23 and 20 and returns into abutment with the pin 13. Of course, the trip 21 then moves away from the moving contact of the switch 15 and the latter opens to interrupt the electric circuit and to bring about a collapse of the magnetic field so that the core 12a ceases to attract the armature 11. The spring 9 then contracts and returns the impeller 7 to the position of rest. During such movement, the arm 29 of the impeller slides over the pin 6 and the rounded head of the arm 28 displaces the pawl 27 against the bias of the spring 19 so that the arm 28 can return into abutment with the pin 10. The pawl 27 snaps back and holds the impeller 7 in the position of rest. During its return movement, the impeller 7 displaces the blade 1 through an angle which is less than necessary to expose the opening 3. The bias of the spring 9 is stronger than that of the spring 19, and this accounts for automatic return of the impeller 7 to its position of rest.

It is clear that the improved structure is susceptible of many modifications without departing from the spirit of my invention. For example, the impeller 7 may transmit impulses to a shutter which comprises two or more blades. Also, the light-sensitive resistor 14 may be replaced by a variable resistor whose resistance may be regulated by hand. If the camera is to be used for taking pictures in daylight as well as with flash illumination, the electric circuit preferably comprises a fixed second or supplemental resistor 14a (indicated by phantom lines) which can be connected in circuit with the components 12, 13 and 15 as a substitute for the resistor 14 whenever the operator decides to make an exposure with flash illumination. The resistance of the resistor 14a is selected in such a way that it causes the electromagnet 12 to attract the impeller 7 with a force which produces an exposure time best suited for taking pictures with flash illumination.

A very important advantage of the improved camera is that the exposure time may be selected by resorting to a very simple, compact and rugged structure. This structure comprises a small number of component parts, and the electric circuit of the actuating means is extremely simple and reliable. The force necessary to propel the impeller 7 against the shutter blade 1 is very small, particularly when compared with the force required in mechanisms wherein the sutter must be displaced by mechanical means.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera, shutter means movable between closed and open positions and comprising motion receiving means; impeller means movable from a position of rest at different speeds into striking engagement with said motion receiving means so as to strike the same with different impact forces and to thus propel said shutter means from closed position at different speeds corresponding to different exposure times; actuating means including moving means operable to assume a plurality of conditions in each of which said moving means moves said impeller means at a different speed from said position of rest, selecting means for selecting the condition of said moving means for correspondingly varying the speed and impact force of said impeller means and for thereby varying the speed at which the shutter means moves from closed position, and operating means for rendering said moving means operative; and means for urging said shutter means to closed position.

2. A structure as set forth in claim 1, wherein said shutter means comprises a single blade.

3. A structure as set forth in claim 1, further comprising means for biasing said impeller means to said position of rest.

4. A structure as set forth in claim 1, further comprising abutment means for terminating the movement of said shutter means away from closed position when the shutter means reaches said open position.

5. A structure as set forth in claim 1, wherein said impeller means comprises a lever which is rockable about a fixed axis, and further comprising means for biasing said lever to the position of rest.

6. A structure as set forth in claim 5, further comprising abutment means for preventing further displacement of said shutter means away from said closed position beyond said open position in response to impacts transmitted by said impeller means whereby said shutter means rebounds from said abutment means when an impact is stronger than necessary to move said shutter means to open position.

7. A structure as set forth in claim 1, wherein said moving means comprises electromagnet means energizable to thereby move said impeller means from the position of rest and said selecting means comprises resistor means in circuit with said electromagnet means, said operating means comprising trigger means for temporarily completing said circuit.

8. A structure as set forth in claim 7, wherein said resistor means comprises a plurality of resistors one of which is connected in said circuit at a time and wherein at least one of said resistors is a variable resistor.

9. A structure as set forth in claim 7, wherein said resistor means is a variable resistor and said actuating means further comprises a source of electrical energy connected in series with said resistor means and with said electromagnet means.

10. A structure as set forth in claim 9, wherein said variable resistor is a light-sensitive resistor.

11. A structure as set forth in claim 7, wherein said resistor means is a light-sensitive resistor so that, in response to completion of said circuit, the electromagnet means displaces said impeller means at a speed which is a function of the intensity of light to which said resistor is exposed.

12. A structure as set forth in claim 11, wherein said impeller means is biased to said position of rest and said electromagnet means comprises an armature provided on said impeller means and a core which attracts said armature in response to completion of said circuit.

13. A structure as set forth in claim 12, further comprising blocking means provided on said operating means for holding said impeller means in the position of rest and for automatically releasing said impeller means upon completed energization of said electromagnet means.

14. A structure as set forth in claim 7, wherein said actuating means further comprises normally open switch means in series with said resistor means and said electromagnet means, said trigger means being operative to close said switch means and to thereby energize said electromagnet means at the will of the operator.

15. A structure as set forth in claim 14, wherein said trigger means is movable by hand from an idle position to an operative position in which it closes said switch means, and further comprising indicating means for signaling such operative position to the operator's hand.

16. A structure as set forth in claim 14, wherein said trigger means is movable by hand from an idle position to and beyond an operative position in which it closes said switch means, said trigger means comprising blocking means for normally holding said impeller means in the position of rest and for releasing said impeller means in response to movement of said trigger means beyond said operative position.

17. A structure as set forth in claim 16, wherein said trigger means comprises a pair of levers rockable about a common axis, one of said levers being arranged to move the other lever and to close said switch means, said blocking means being provided on said other lever.

18. A structure as set forth in claim 17, further comprising resilient means for biasing said other lever in a direction to oppose movement of said levers with reference to each other.

19. A structure as set forth in claim 18, further comprising relatively strong resilient means for biasing the impeller means to said position of rest and additional resilient means for biasing said trigger means to said idle position.

References Cited

UNITED STATES PATENTS

| | | | |
|---|---|---|---|
| 2,887,938 | 5/1959 | Nassour | 95—55 X |
| 2,999,445 | 9/1961 | Fahlenberg. | |
| 3,291,019 | 12/1966 | Eagle. | |
| 3,298,773 | 1/1967 | Auracher. | |
| 3,314,347 | 4/1967 | Kremp. | |
| 3,033,092 | 5/1962 | Ernisse | 95—59 |

JOHN M. HORAN, *Primary Examiner.*